(12) United States Patent
Chapnik et al.

(10) Patent No.: US 6,456,421 B1
(45) Date of Patent: Sep. 24, 2002

(54) SYSTEM FOR PRINTING WITH PROGRAMMABLE SPATIAL LIGHT MODULATOR AND METHOD

(75) Inventors: Philip D. Chapnik, Newton; Bruce K. Johnson, Andover; George D. Whiteside, Lexington; Joseph F. Deck, Somerville, all of MA (US)

(73) Assignee: Polaroid Corporation, Cambridge, MA (US)

( * ) Notice: Subject to any disclaimer, the term of this patent is extended or adjusted under 35 U.S.C. 154(b) by 0 days.

(21) Appl. No.: 09/652,987

(22) Filed: Aug. 31, 2000

Related U.S. Application Data

(60) Provisional application No. 60/151,968, filed on Sep. 1, 1999.

(51) Int. Cl.[7] ......................... G02B 26/00; G02B 28/06; G09G 3/34
(52) U.S. Cl. ....................... 359/292; 359/223; 359/260; 345/84
(58) Field of Search .................... 359/223, 224, 359/260–292, 295, 298; 345/84, 85

(56) References Cited

U.S. PATENT DOCUMENTS

| | | | |
|---|---|---|---|
| 5,365,283 A | 11/1994 | Doherty et al. | 348/743 |
| 5,706,061 A | 1/1998 | Marshall et al. | 348/743 |
| 5,777,589 A | 7/1998 | Gale et al. | 345/84 |
| 5,909,204 A * | 6/1999 | Gale et al. | 345/85 |
| 6,369,832 B1 * | 4/2002 | McKnight | 345/691 |

FOREIGN PATENT DOCUMENTS

| EP | 0 655 858 A1 | 3/1993 | H04N/1/40 |
|---|---|---|---|

OTHER PUBLICATIONS

PCT International Search Report, PCT/US00/24130, Dec. 11, 2000.
WIPO Publication, WO 01/17232 A1, Sep. 1, 2000.

* cited by examiner

Primary Examiner—Georgia Epps
Assistant Examiner—Tim Thompson

(57) ABSTRACT

The present invention provides in one aspect, a method of controlling a SLM comprising the following steps: providing a sequential color SLM controller, and a SLM; providing a means whereby said sequential color SLM controller loads optimum values for a single color into control registers of said SLM, during all the field time slots of each video frame; also causing said SLM to modulate light of said single color, during said field time slots of each video frame, whereby the duty cycle for display of said color is increased relative to operation in a normal sequential color mode. Another aspect of the present invention is an apparatus for controlling a SLM comprising a single color SLM controller, a SLM, and a means for causing said single color SLM controller to load optimum values for a single color into control registers of said SLM during all the field time slots of each video frame; wherein said SLM is caused to modulate light of said single color, during said field time slots of each video frame, whereby the duty cycle for display of said color is increased relative to operation with a sequential color SLM controller in a sequential color mode. Another aspect of the current invention is a method for controlling a sequential color SLM with programmable grayscale characteristics comprising providing a programmable grayscale SLM; and programming the grayscale characteristic of said SLM to implement a grayscale characteristic that is adapted for printing onto photosensitive medium.

8 Claims, 4 Drawing Sheets

SYSTEM FOR PRINTING WITH PROGRAMMABLE SPATIAL LIGHT MODULATOR AND METHOD

This application claims the benefit of provisional application 60/151,968 filed Sep. 1, 1999.

BACKGROUND

The present invention relates, in general, to spatial light modulators (SLMs) and, in particular, to methods and apparatus for enhancing the versatility of such SLMs for different modes of operation including printing.

SLMs are well-known devices that are employed for displaying electronically captured images in a variety of applications. One such known SLM is an area LCD of the reflective type, such as commercially available from Colorado Microdisplay, Inc., of Colorado, USA. The SLM is operable for displaying images, for example, in electronic viewfinders. While the captured images that are displayed are suitable for viewing purposes they do not necessarily serve adequately for printing photographic quality prints, especially in a relatively short amount of time. One reason for this is that the light intensity levels associated with the grayscale levels of SLMs of the foregoing type are not usually of the correct levels for producing high quality photographic images. Another reason for this is that SLMs of the foregoing type have a relatively low duty cycle since their red, green and blue images are sequenced fairly rapidly in order to provide dynamic images suitable for viewing, for instance, in a viewfinder mode. Such a relatively low duty cycle, while desirable in terms of viewing, increases the amount of time necessary to print such images and thus is relatively less desirable.

SUMMARY

The present invention provides in one aspect, a method of controlling a SLM comprising the following steps: providing a sequential color SLM controller, and a SLM; providing a means whereby said sequential color SLM controller loads optimum values for a single color into control registers of said SLM, during all the field time slots of each video frame; also causing said SLM to modulate light of said single color, during said field time slots of each video frame, whereby the duty cycle for display of said color is increased relative to operation in a normal sequential color mode.

Another aspect of the present invention is an apparatus for controlling a SLM comprising a single color SLM controller, a SLM, and a means for causing said single color SLM controller to load optimum values for a single color into control registers of said SLM during all the field time slots of each video frame; wherein said SLM is caused to modulate light of said single color, during said field time slots of each video frame, whereby the duty cycle for display of said color is increased relative to operation with a sequential color SLM controller in a sequential color mode.

Another aspect of the current invention is a method for controlling a sequential color SLM with programmable grayscale characteristics comprising providing a programmable grayscale SLM; and programming the grayscale characteristic of said SLM to implement a grayscale characteristic that is adapted for printing onto photosensitive medium.

The above and the scope of the present invention will become apparent after reading a detailed description thereof when taken in conjunction with the accompanying drawings.

DETAILED DESCRIPTION OF THE PREFERRED EMBODIMENTS

For purposes of clarity, we will first define the following terms.

SLM, Pixel Array, Pixels

Figure 3A:
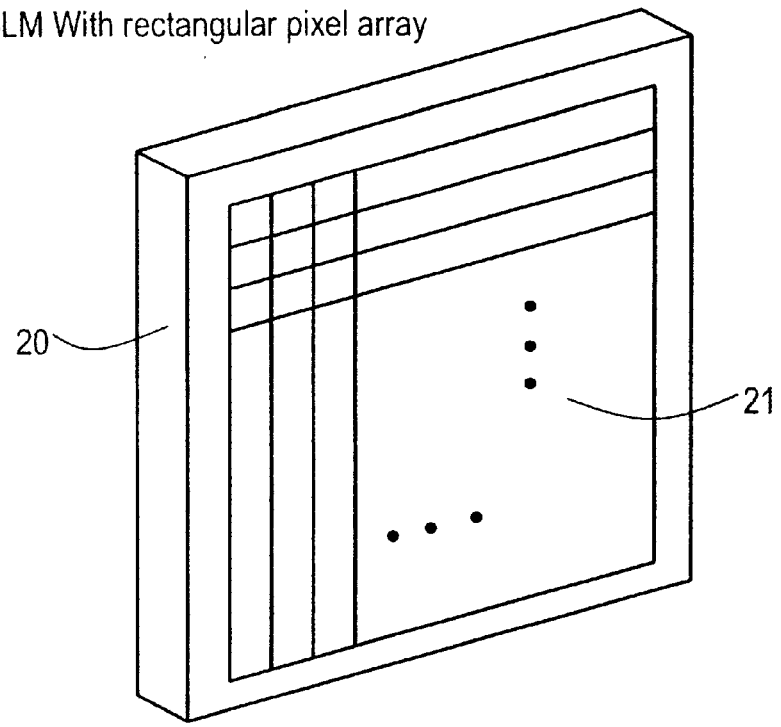
FIGS. 3a and 3b show schematically two types of SLM pixel arrays.
Figure 3B:
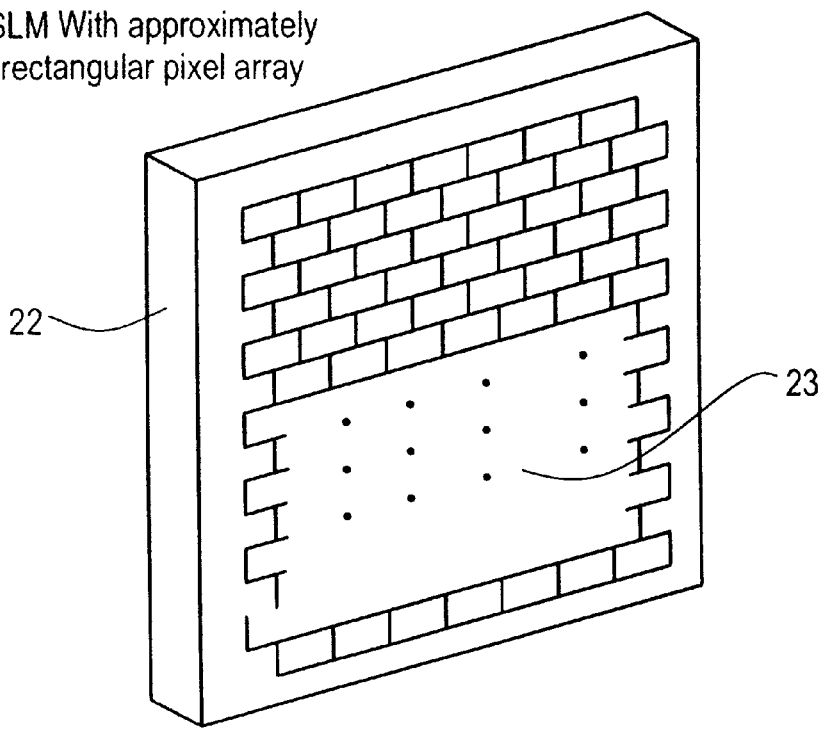

Area Array Spatial Light Modulators (SLMs) are a class of devices in which a rectangular array of independently-addressable light modulating pixels is disposed so that when viewed by an observer, either directly or through imaging optics such as a magnifying optical system, an image can be perceived by the observer. In some SLMs, the array of pixels is not precisely rectangular, but alternate rows of the pixel array are displaced by a fraction of the pixel pitch. Nonetheless, the entire pixel array is disposed in a shape that could be circumscribed by a rectangle. FIGS. 3a and 3b illustrate schematically such SLMs, showing in FIG. 3a an SLM 20 with a rectangular pixel array 21 and in FIG. 3b a different SLM 22 with an approximately rectangular pixel array 23. Because of its intended function to generate an image that can be perceived by an observer, a SLM is often and equivalently referred to as a "display."

The pixels of a SLM are typically reflective, transmissive or emissive light-modulating elements, spaced at regular horizontal and vertical intervals. The horizontal and vertical intervals between rows and columns of pixels are known as the horizontal and vertical pitch. In some embodiments of SLMs, there are non-active areas between the pixels of the pixel array which are not capable of modulating light. Such non-active areas are typically non-reflective, non-transmissive, or non-emissive, such that in every case the non-active areas appear to be black when viewed by an observer. In a typical application of such a device for viewing by an observer, the observer's visual system cannot readily distinguish the individual pixels in the array because the angular subtense of the individual pixels is too small for an observer to discriminate them as individual elements. However, in some applications that are useful in the known state of the art, the observer's visual system is able to discriminate individual pixels.

Pixel Value

All known SLMs operate on the principal that the perceived light intensity of each pixel can be modulated between a minimum and a maximum light intensity level, with zero or more intensity levels addressable between the extreme levels. In many known SLMs, the brightness level of each of the pixels is controlled by means of a digital word that is herein called a "pixel value." Each pixel of the pixel array is understood to have associated with it a pixel value, which can be expressed as a digital number, and which is independent of the pixel value of any other pixel in the array. The length of such digital word is often between 1 and 8 bits long and depends on the design of the particular SLM. An SLM for which the pixel values are digital words of 1 bit word length is also called a "binary SLM" since it admits of only 2 brightness levels for each pixel. SLMs of greater word length can also be operated in "binary mode" by restricting the pixel values that are used to only two, often the minimum and maximum brightness levels.

Grayscale Characteristic, Brightness Level

The "grayscale characteristic" of an SLM is the relationship between the light intensity level of each pixel of the SLM and its corresponding pixel value. Hereinafter, the apparent light intensity level of a pixel that is modulating light according to a grayscale characteristic will be called the pixel's "brightness level." The metric used to scale the brightness level can vary according to the desired application of the SLM. For the present invention we shall find it convenient to scale brightness level according to the radiometric intensity of the pixel. Accordingly, we shall understand the grayscale characteristic of the display to mean the relationship between the radiometric intensity of light modulated by each pixel of the display and the pixel value assigned to each such pixel. For SLMs of reflective and transmissive type, defined below, we shall equivalently treat the grayscale characteristic as the relationship between the reflectivity or transmissibility of the pixels and the pixel value. In many SLMs currently known, one typical design goal is that the grayscale characteristics of all the pixels of the SLM should be identical. However, in practice this goal is not usually achieved and there are variations among the grayscale characteristics of the individual pixels of the SLM. Such variations among nominally identically performing pixels are known as "display non-uniformities." Nonetheless we shall speak of a single grayscale characteristic for the entire SLM and mean thereby the nominal grayscale characteristic which is intended for all the pixels of the SLM.

In some known SLMs, the pixel value is used directly to operate circuitry, typically a digital-to-analog converter (DAC), or for binary SLMs an electronic switch, that operates to generate the brightness level of the pixel.

Programmable Grayscale Characteristic

In some known SLMs, the pixel value is used as an index to select from a lookup table (LUT), a value, known as a "LUT entry," which then is used to operate circuitry that operates to generate the brightness level of the pixel. This design is often implemented using a device known to those skilled in the art as a "lookup DAC." The LUT values are often of higher resolution, i.e. greater word length, than the pixel values. Some known SLMs of this type afford in addition a capability for the user of the SLM to program the entries of the LUT. When available such an SLM affords a degree of programmable control over the grayscale characteristic of the SLM by loading said table with values that may be chosen to produce a desired grayscale characteristic, hence such an SLM is said to have a "programmable grayscale characteristic."

Reflective, Transmissive and Emissive SLMs

The light that is modulated by the pixels of a SLM typically is generated either from one or more light sources that are disposed, through the use of an optical system, to illuminate the entire area of the pixel array more or less uniformly, or, alternatively by individual light sources that are coincident with and form the pixels. SLMs of the former type, in which the entire pixel array is more or less uniformly illuminated by light from one or more sources, are further classified as those in which the illumination light is modulated by variable transmission through the pixels, known as "transmissive SLMs," or alternatively those in which the illumination light is modulated by variable reflection from the pixels, known as "reflective SLMs." SLMs of the type in which the light comes from individual sources that are coincident with and form the pixels, are known as "emissive SLMs." Examples of commonly-known transmissive SLMs are liquid crystal displays (LCDs) commercially available from a large number of manufacturers, including both large-screen types, from manufacturers such as Sony, NEC, SG, Hitachi and many others, and miniature types from manufacturers such as Kopin, Sony, and others. Examples of commonly known reflective SLMs also include commercially-available LCDs, manufactured by, among others, Colorado Micro Display and DisplayTech. The DMD®, manufactured by Texas Instruments, is a reflective SLM that is not a LCD. Examples of commonly-known emissive SLMs include commercially available plasma displays from manufacturers such as Fujitsu and Hitachi, electron-excited phosphor devices such as the field emission device (FED), and AC and DC electroluminescent devices such as those manufactured by Planar Corp. These lists of devices are exemplary only and do not comprise an exhaustive list of SLMs for which the present invention is useful.

Color SLMs

The foregoing discussion has not mentioned the color of light modulated by a SLM and indeed the discussion is applicable regardless of the color or colors of light modulated by a SLM. As is known to those skilled in the art, in order for an observer to perceive a full-color image, light of at least three different spectral power distributions, roughly corresponding to blue, green and red color, must be modulated by a SLM. Thus, the full-color image that is perceived by an observer of a color SLM can be thought of to consist of three single-color images, one each of red, green and blue. In addition, the characteristics of human vision are such that, in order for an observer to perceive a single full color image, such three single color images must be presented to the observer while respecting stringent limitations on the spatial and temporal separation between the three single color images. Such limitations will be familiar to those skilled in the art.

Spatial Color, Sequential Color

Two methods of generating three such color images that will be perceived by an observer as a single full-color image are known and in widespread use. One such method is known as "spatial color" and the other such method is known as "time-sequential color," or, equivalently, "sequential color." These terms and their meaning will be familiar to those skilled in the art.

Having finished defining terms, we commence discussion of the instant invention. This invention comprises two techniques for controlling a spatial light modulator using light of several different colors to generate a sequence of images. The sequence is imaged onto photosensitive medium and thereby exposes the medium, so that a color image will be apparent to an observer. Typically the photosensitive medium may require development before the image is apparent.

First Technique of the Invention

Advantages of the First Technique

Figure 4A:
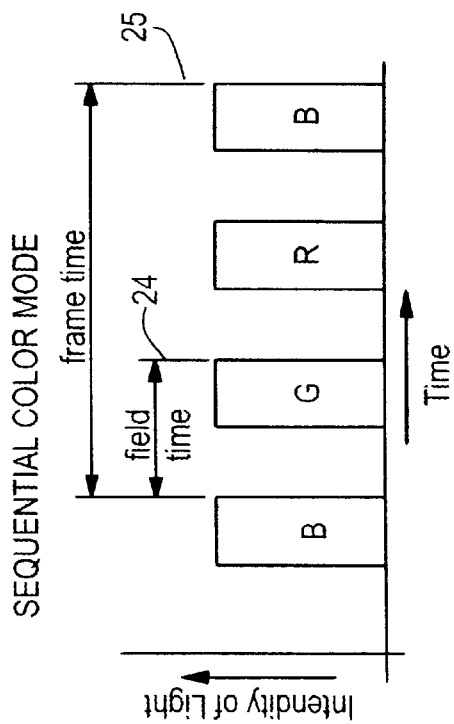
FIGS. 4a and 4b show schematically two operating modes of a sequential color SLM.
Figure 4B:
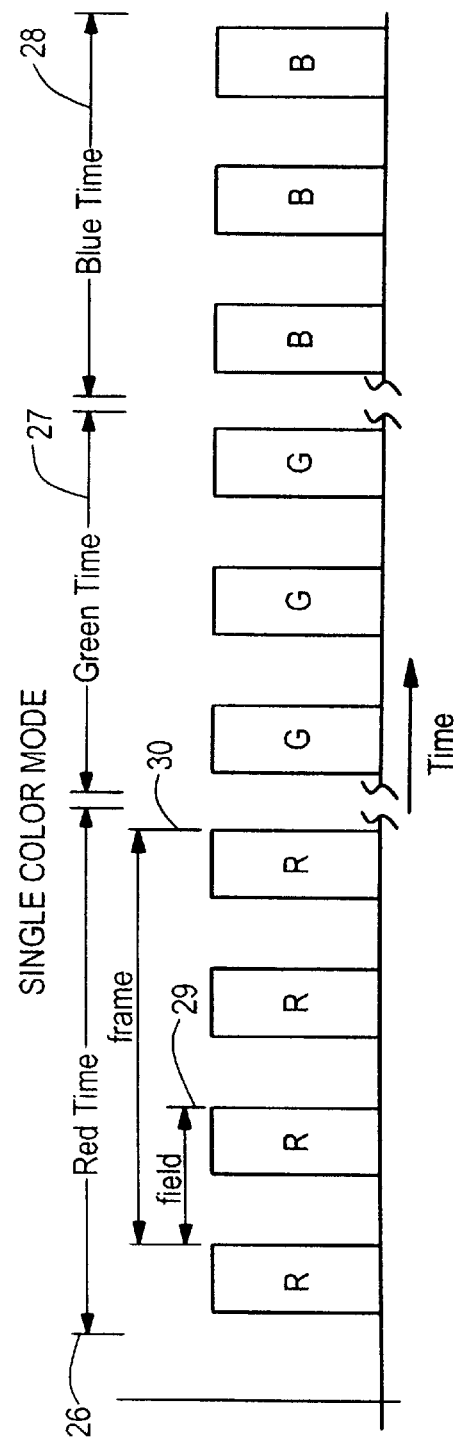

A first technique is applicable to spatial light modulators that use time-sequential color to display full-color video images. Such a mode of operation is shown schematically in FIG. 4a. Such spatial light modulators normally display frames 25 of color video images, each frame 25 comprising three fields of single-color video image information, for example green field time 24. In every frame 25, the three fields comprise one field each displaying red, green and blue image information. In one embodiment of this first technique, the video frames are controlled so that the comprising fields, display image information all in the same color, rather than one each in three different colors. The result is a single color mode wherein the single color mode frames consist of single color fields, for example, as shown in FIG. 4b, 30 is a single color mode frame, and 29 is a single color field of the color red. Another embodiment of this first technique consists of replacing the usual controller of such a spatial light modulator, such usual controller being adapted to sequential color and capable of displaying within each video frame 25 one video field each of red, green and blue image information, with a controller that is less costly and is capable of displaying within each single color vide frame 30 only one field of video information, of a color that is selectable. The effect of either embodiment, when using a spatial light modulator to expose photosensitive medium is that the medium experiences a rapid succession of image fields of a single color, rather than a rapid succession of image fields of different colors. Such a mode of operation is shown schematically in FIG. 4b. Exposure of the medium in three colors, with either embodiment, is accomplished by accumulating the necessary exposure first in one color, such as for example red 26, with as many single color video fields and frames as are necessary to accumulate the required exposure time; next, and similarly, in a second color, for example green 27; third, and similarly, in the final remaining color, for example blue 28. This first technique has two advantages, namely that the overall elapsed time of exposure for all three colors is reduced, and, by virtue of such reduction of elapsed time, the effective sensitivity of photosensitive medium that exhibits exposure reciprocity failure is increased.

Implementation of the First Technique

In normal operation of a SLM, the operation of the SLM is optimized for display of each color by loading configuration data into control registers of the SLM synchronously with the display of the video field of the corresponding color. For example, the best performance of the SLM, in terms of contrast range and maximum brightness level, when it is modulating red light is obtained by loading red light configuration data into these registers, and similarly loading blue and green configuration data for modulating blue and green light. In the case where the SLM is a LCD, such control registers control, for example, the coverglass voltage of the LCD and the range of voltages that is available to effect the modulation of light by each pixel of the pixel array. Different coverglass voltage and pixel voltage range produce optimal performance, i.e. better contrast range and improved maximum brightness level, for different colors of light, and therefore the contents of the control registers should be changed according to the color of light modulated by a SLM. The optimum values for each color may be provided by the manufacturer of a SLM.

In the normal sequence of operation of a SLM, video fields of each primary color follow at a rate so rapid that the perception of individual fields is fused by the viewer's visual system. As suggested in FIG. 4a, a continuous sequence of red, green and blue fields is displayed by the SLM. The first technique of the invention is to replace this mode of operation with a mode in which successive fields are a single color, selectable as red, green or blue. This mode is illustrated for example, for red color display as the red time section 26 of FIG. 4b. In order to preserve optimum operation of the SLM in this mode, the normal operation of the SLM's controller, in which optimum control register values are loaded synchronously with the fields of each color, must be replaced by a mode of operation in which the control registers are loaded always with optimum values for one color.

This first technique allows an effective tripling of the duty cycle for display of any one color. In the normal mode, elapsed time is segmented into video field time slots of each color. Necessarily, during the elapsed time of a video frame, one field each of red, green and blue image information is displayed. Thus, the duty cycle of each color is ⅓ of the video field time per video frame. In the new mode of operation, the same number and timing of field time slots per video frame are used as in the normal mode. However, the field time slots devoted to display of, say, blue and green are used instead for display of for example, red information. Thus, for example, the duty cycle of red information becomes 100% of the video field time per video frame when the SLM is adapted to display red image data.

Alternative Implementation of the First Technique

An alternative implementation of this first technique may be realized by replacing the normal sequential color controller of the SLM with a controller that is simpler and less costly and is capable of driving the SLM with video frames each comprising a single video field only. In this implementation, the single color SLM controller repeatedly loads the control registers of the SLM with values that are optimum for display of a single color in successive video fields. The values so loaded may be controlled by external means to be the optimum values for any color of light that is to be modulated by the SLM.

The effect of such single color controller on the operation of the SLM is similar to that of operating SLM's normal controller in the manner previously specified.

Second Technique of the Invention

Advantages of the Second Technique

A second technique is independent of the foregoing technique, and is applicable to a SLM that has a programmable grayscale characteristic. The matter of this technique is the selection of such programmable grayscale characteristic to approximate a desired characteristic. When a SLM is used to create an image on photosensitive medium, the use of a SLM that admits of a programmable grayscale characteristic can improve the quality of the resulting image by proper choice of the grayscale characteristic, as will be described herein, relative to a SLM that does not permit the grayscale characteristic to be altered.

Implementation of the Second Technique

In a SLM that has a programmable grayscale characteristic, a pixel value loaded into a pixel of the pixel array does not directly determine the brightness level of the pixel. Rather, the pixel value that is loaded is used as an index to a lookup table (LUT), which will be called the "grayscale LUT." The table value indexed by the pixel value is the value that determines the brightness level of the pixel. Typically the entries in the grayscale LUT have greater word length, hence higher precision, than the word length of the pixel values themselves. For example, in one known reflective liquid crystal SLM manufactured by Colorado Micro Display, the CMD8X6D, the pixel values have 6-bit word length while the grayscale LUT entries have 8-bit word length.

SLM manufacturers will usually design their products so that the available brightness levels approximate the optimum brightness levels for viewing by a human observer. Often for human viewing such brightness levels are described by an exponential rise in brightness level as a function of pixel value, known as a gamma law. In human viewing applications, gamma-law brightness levels with gamma in the range of 1.7 to 2.5 are typical, as will be familiar to those skilled in the art. A schematic representation of such a gamma curve 32 is identified in FIG. 5.

Figure 5:
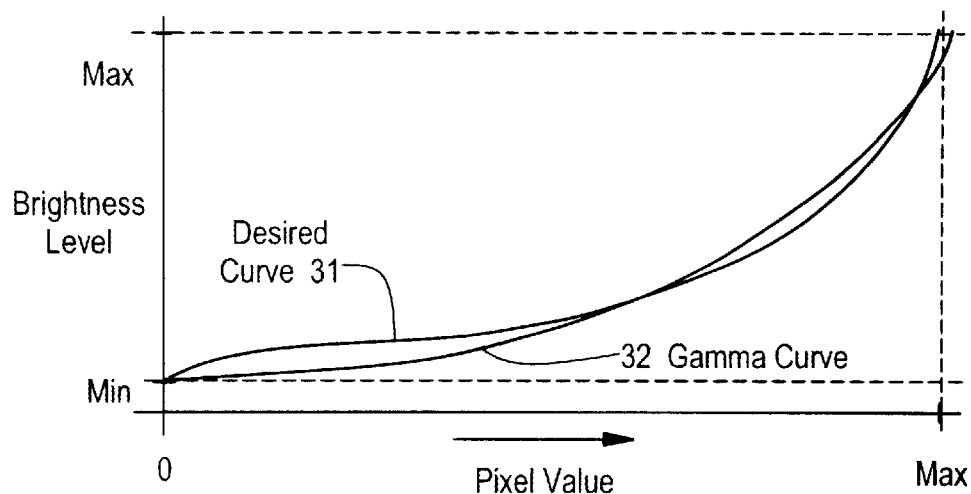
FIG. 5 shows schematically two characteristic SLM brightness curves.

Such a grayscale characteristic is not usually desirable when a SLM is applied to create images on photosensitive medium. Although the details of the optimum curve differ depending on the particular photosensitive medium selected, the color of light used for exposure, and possibly other factors as well, the optimum curve is not usually well described by a gamma law. A schematic representation of a typical desired curve 31, as shown in FIG. 5, and the difference between the desired curve 31 and the typical gamma curve 32 is evident.

The native grayscale characteristic of a SLM with programmable grayscale characteristic using the full word length of the grayscale LUT can be determined by a suitable experiment. For example, in one such experiment, all the entries of the grayscale LUT are filled with a single value, which value is chosen from the range of values permitted by the word length of the grayscale LUT. A grayscale LUT of 8-bit word length permits grayscale LUT entries of digital value from 0 to 255. In the suggested experiment, by loading all the entries of the grayscale LUT with a single value, every pixel in the array will assume the brightness level corresponding to that value, regardless of the pixel values loaded. With suitable measuring equipment, such as for example a photomultiplier tube (PMT) or alternatively one of several other devices that are familiar to those skilled in the art, the brightness level of the pixels of the SLM, usually averaged over several pixels in the array, can easily be measured. By systematically allowing the value loaded into every entry of the grayscale LUT to assume every possible value appropriate to the word length of the grayscale LUT, and making brightness level measurements of the pixels of the SLM as the SLM responds to each such grayscale LUT value, it is possible to measure and tabulate a list of the brightness level of the SLM in response to every possible grayscale LUT value. Often, it will not be necessary to make such a measurement for every possible grayscale LUT value, but rather for a subset of well-chosen values, and then it may be possible to fill in a list of SLM brightness levels at the not-measured grayscale LUT values by interpolation between or extrapolation from the measured values. In yet another suggested implementation of the experiment, the SLM's brightness levels are measured for a well-chosen subset of the grayscale LUT values, and the SLM's brightness levels at not-measured grayscale LUT values are predicted using a curve fitting technique that relies on the measured data. However it is constructed, as a visual aid the resulting table of values can be presented as a curve of brightness level versus grayscale LUT value 33, as shown on left-hand side of FIG. 6.

Once the SLM's grayscale characteristic in response to the full word length of the grayscale LUT has been measured, by one of the suggested experiments or by others that will be evident to those skilled in the art, a subset of desirable SLM brightness levels can be selected. The number of selected levels can be up to the number of addressable grayscale LUT entries, which is essentially determined by the word length of the SLM's pixel values. For example, a subset of up to 64 levels can be selected for a SLM that has a 6-bit pixel value word length.

Figure 6:
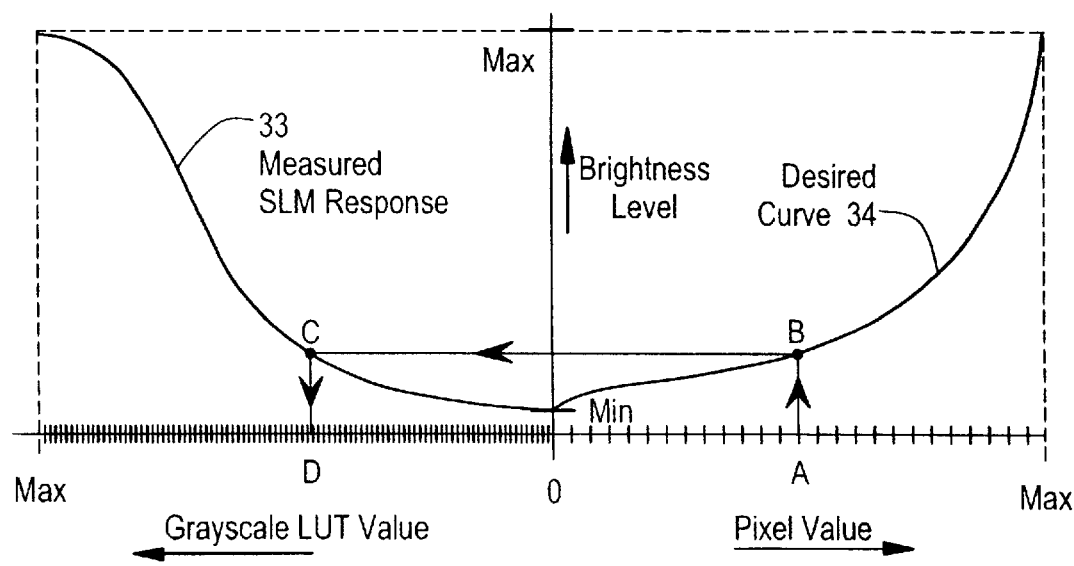
FIG. 6 shows a desired SLM brightness curve adapted for printing and a SLM native brightness characteristic.

For printing on photosensitive medium, an effective way to select the desired levels is suggested with reference to FIG. 6. Desired curve 34 suggests a typical desired response of brightness level vs. pixel value, from zero through the maximum possible pixel value. As mentioned, measured response curve 33 on the left hand side of FIG. 6 represents a typical brightness vs. grayscale LUT entry value, generated for example by one of the experiments suggested in the foregoing. For each possible pixel value level, such as for example the value labeled "A" in FIG. 6, the desired curve has a brightness level, identified as the height of point "B" in FIG. 6. This brightness level can be carried over to the measured SLM curve 33, as represented by point "C" in FIG. 6, and carried down to the grayscale LUT axis, point "D" in FIG. 6. In general point "D" will lie between possible values of the grayscale LUT entries, but the nearest value can be selected and loaded in to the grayscale LUT as the entry for the element indexed by pixel value "A." By allowing "A" to assume every possible value on the pixel value scale and following such a procedure, the grayscale LUT can be populated with entries that approximate, as closely as possible, the optimum grayscale characteristic for the application. Although in the example suggested here a graphical method has been used as a means of illustrating the intellectual steps involved, one skilled in the art can easily produce the same result without recourse to graphical methods, using purely mathematical methods.

Embodiment of the Techniques

Figure 2:
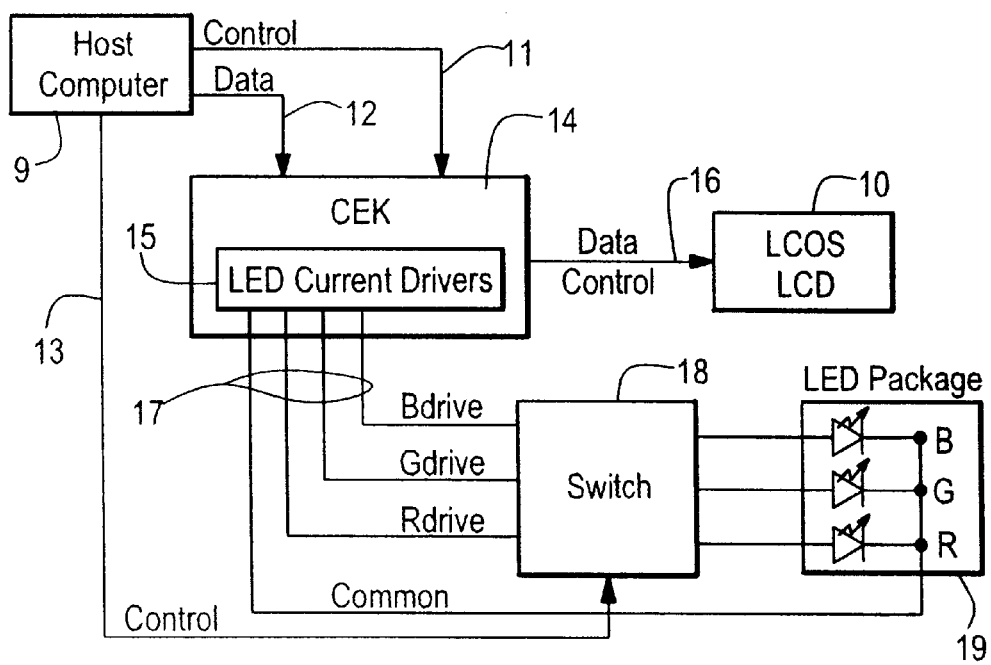
FIG. 2 is a block diagram defining a logic circuit of FIG. 1.

For purposes of illustration, the following is one example of how the techniques of the invention may be used in an apparatus. With reference to FIG. 2, the operation of the apparatus is as follows. A Colorado Micro Display (CMD) Chipset Evaluation Kit (CEK) 14, drives a CMD SVGA reflective liquid crystal on silicon (LCOS) LCD SLM 10, model CMD8X6D. The CEK 14 provides control and data information to the LCOS LCD 10. The control information is used to affect the operation of the LCOS LCD 10 in several ways of significance to the invention. In a first significant effect, the CEK 14 can control the coverglass voltage and the pixel voltage range to levels that may optimize the operation of the LCOS LCD 10 for modulation of a specific color of light. In a second significant effect, the CEK 14 can load a grayscale characteristic LUT to the LCOS LCD 10, which affects the relationship between the pixel value data loaded to the LCOS LCD 10 and the corresponding brightness level of the pixels. The data information provided through link 16 by the CEK 14 to the LCOS LCD 10 comprises the values that are loaded into the pixel array of the LCOS LCD 10 to effect modulation of light and produce an image. The CEK 14 through links 17 also drives the color LEDs 19 that provide illumination to the LCOS LCD 10.

The host PC 9 generates a full color image which is transmitted by the "data" connection 12 to the CMD CEK 14, buffered, and transmitted at the appropriate time to the LCOS LCD 10. There is an additional "control" transmission link 11 between the PC 9 and CEK 14 which is capable of carrying control and setup instructions that modify the behavior of the CEK 14.

To implement the duty cycle improvement described in the foregoing, the links 17 from the CEK 14 to the LEDs 19 have been modified by the addition of a switch 18. Also, additional software that runs on the host PC 9 has been written. The switch 18, and associated control signals 13 from the host PC 9, allow each of the LEDs in package 19 to be connected to any of the CEK's LED driver lines 17. The implementation of the switch 18 is not specified in this invention but is evident to those skilled in the art. The implementation of the programmable grayscale characteristic, described in the foregoing as the second technique of the invention, does not require any additional hardware components in this embodiment beyond those shown in FIG. 2.

Figure 1:
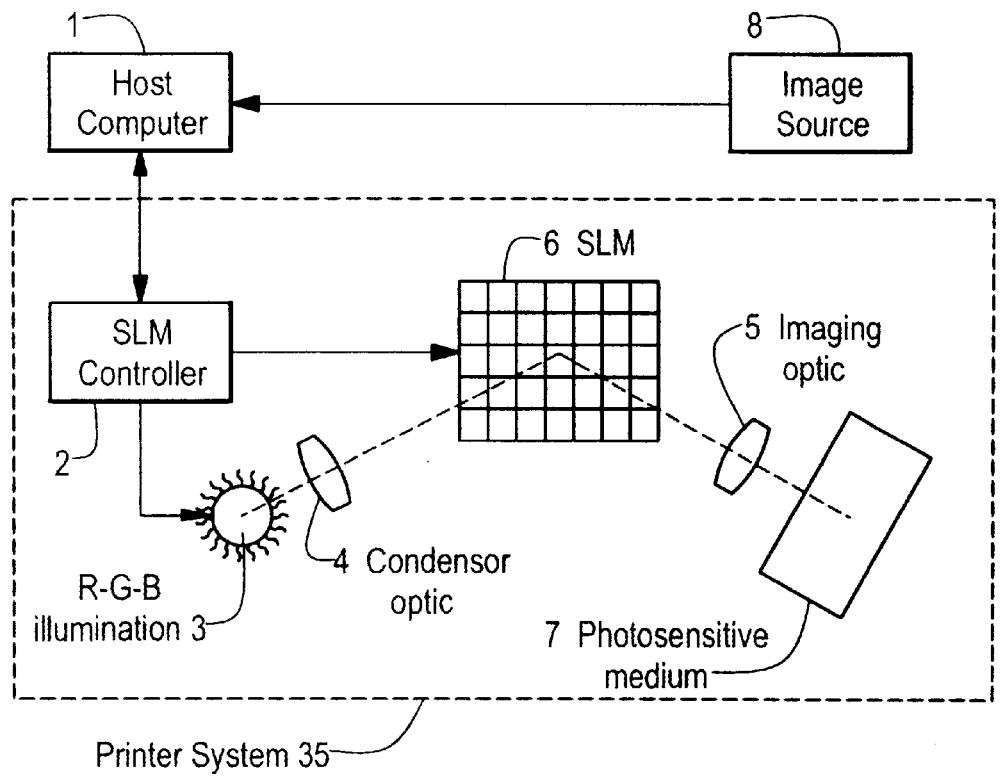
FIG. 1 is a block diagram illustrating one system for achieving the improved printing of the present invention.

One practical application of a display system of the type shown in FIG. 2 is shown in FIG. 1. In this embodiment, a printer system 35 is adapted for printing images on a photosensitive medium 7 stored in a light-tight enclosure. The imaging module of the printer 35 includes a suitable SLM and its control circuitry and controller, such as the system suggested by FIG. 2. In the present embodiment, light is generated by an illumination system 3, optically coupled to the SLM by a suitable condenser system 4, modulated by the SLM 6, and imaged, through a suitable optical system 5, onto photosensitive medium 7. The image file to be printed by the printer system 35 comes from a suitable image source 8, and may be obtained in a variety of ways. For example, the file may be acquired using any image sensor known in the arts, for example, a CCD or CMOS type. The image sensor captures electronic signals of, for instance, a scene and transmits them as an image file to a logic circuit that includes buffers, A/D converters and a microprocessor for controlling the operation of printing operations that are consistent with the present invention. Alternatively, the image file may be obtained from a source of previously-acquired images such as a sample image CD-ROM or any of many other known sources of digital image files. Another source of image files is a known method of screen capture from a user's personal computer.

The normal operation of the system shown in FIG. 2 in sequential color mode is described, so that a contrast may be drawn between normal operation and operation using the new technique. In normal operation, software running on the host PC 9 loads control information to the CEK 14 which results in the LCOS LCD entering video mode, in which it displays successive frames of video image data, each consisting of three video fields, one field each of the red, green and blue image information of the video image. Software running on the host PC 9 also uses the control link 11 to the CEK 14 to load three grayscale lookup tables (LUTs) into registers on the CEK 14, one LUT each appropriate for the display of red, green and blue image information intended to be viewed by a human observer. Software running on the host PC 9 further loads into registers on the CEK 14 three sets of data that contain the appropriate settings for the coverglass and pixel range voltages of the LCOS LCD 10, one set each providing optimum LCOS LCD performance for red, green and blue illumination. Software running on the host PC 9 yet further loads into registers on the CEK 14 three sets of data that define the effective current levels at which the CEK 14 will drive each of the three color LEDs 19. In its normal operation, the CEK 14 then performs the following operations during each video field: the LCOS LCD 10 is programmed with the control register data required to implement the correct coverglass voltages and pixel voltage range for one color, for example blue. The LCOS LCD 10 is further programmed with the grayscale LUT appropriate for display of image data of the same color, in this example the blue grayscale LUT. The LCOS LCD 10 is then programmed with image data representing the information of the video frame in the same color, in this example the blue image data. Finally, after an appropriate time delay known as the settling time, the CEK 14 turns on and drives with the appropriate effective current level the color LED of package 19 that supplies the illumination of the same color, in this example the blue LED. This sequence of operations comprises one video field. The CEK 14 then repeats a similar sequence, substituting however the control data and image data appropriate for a second color and driving a LED, in package 19, at the appropriate current for the second color. Finally the CEK 14 repeats a similar sequence with the control and image data and driving a LED of the remaining color. Such a sequence of three fields comprises a video frame. The CEK 14 then executes an essentially similar sequence for the next video frame, typically in this case using the same LCOS LCD control data and the same LED current data, but using the image data appropriate for the next video frame. Such a sequence of video frames, each comprising three color fields, continues indefinitely until the operation of the CEK 14 is halted by removing power or by some other cause for interruption. In this example of normal system operation, the video frame rate is 85 frames per second, and, since each frame comprises 3 video fields, the video field rate is seen to be 255 fields per second. Thus, each frame has a duration of approximately 11.76 milliseconds and each field has a duration of approximately 3.92 milliseconds. Of the 3.92 millisecond duration of each field, the LED which is illuminated during the field is illuminated for the last approximately 1 millisecond of the field time. The first approximately 2.92 milliseconds of the field time is required for loading of LCOS LCD control and image data information and the settling time. Thus, the duty cycle for display of any one color is 1 millisecond out of every 11.76 milliseconds, or, approximately, 1/12.

One application for a SLM such as the herein described CMD LCOS LCD, when operating in the normal sequential color video mode, is to image the light modulated by the SLM onto photosensitive medium to expose a color image. However, usually a different amount of exposure time is required in each color of light to expose properly the medium. When operating in sequential color mode to perform such an exposure, a software running on a host PC can control the image data located to a SLM so that appropriate exposures are generated for each color of light, by loading video frames with image data that contains full color information at the beginning of the exposure sequence. After the amount of time has elapsed which is appropriate to expose one color, the software now loads modified video frames containing image data which is all black in the color that has been fully exposed but continues to contain image information for the other two colors. After the exposure time for the second color has been reached, the host software loads video frames that now contain black data for both of the colors that have been fully exposed. After the exposure time for the third color has been attained, the exposure sequence terminates and the medium is completely exposed. Because the duty cycle for each color in sequential video mode is approximately 1/12, the elapsed time for exposure is approximately 12 times the amount of exposure time required for the longest color's exposure. Mathematically we can express this as $T_{ex}=12\ \text{MAX}(T_r, T_g, T_b)$, where $T_{ex}$ is the elapsed time for complete exposure of the medium, $T_r$, $T_g$, $T_b$ are, respectively, the illumination times required of red, green and blue light for correct exposure of the medium, and $\text{MAX}(\cdot)$ indicates the greatest value of the arguments.

The normal operation of the CEK, the LCOS LCD and the color LEDs in normal sequential color mode has just been described in the two paragraphs heretofore. The operation of these devices using the techniques of the instant invention will be described hereinafter, with reference to FIG. 2.

To apply the first technique of the instant invention, the normal operation is altered by changing the software on the host PC 9. The host software first determines which color image should be displayed, for example, green. The host software then loads all of the grayscale registers on the CEK 14 with the grayscale LUTs appropriate to display image information of the chosen color, e.g. green. The host software loads all of the coverglass and pixel range control registers with values appropriate for the display of the current color, in this example green. The host software further loads all of the LED current control registers with information that implements the correct effective current to drive the LED of the chosen color, green as it may be. The software, through the control lines 13 to the switch 18 in FIG. 2, configures the switch 18 so that the chosen LED in package 19 is connected alternately to each of the three CEK LED current drivers 15 during the time that each driver is active. That is, the chosen LED is driven by the driver that it would normally be connected to and by the other two drivers as well. To continue the current example, the control lines 13, under control of the software, configure the switch 18 so that the green LED is connected to the LED drivers 15 of the CEK 14. Finally, the host PC software selects from the source image the image data of the chosen color, and by techniques well known and evident to those skilled in the art, copies the image data of the chosen color, green as it may be, into the buffer areas on the CEK 14 that are normally devoted to the image data of the other two colors, which would be red and blue in this example, and into the green buffer area as well. The CEK 14 and LCOS LCD 10 may then operate as if they were programmed to run in the normal sequential video mode, but what has been achieved is that, during the video field times that would normally be used to display image information of each of the three colors, the LCOS LCD 10 now displays image information of the chosen color, using a grayscale LUT adapted for that color, with coverglass control voltages optimum for that color, and illuminated by the LED supplying light of that color. Thus the effective duty cycle for display of the chosen color has been increased from 1 millisecond in 11.76 milliseconds, or approximately 1/12, to 3 milliseconds in 11.76 milliseconds, or approximately 1/4, or three times the duty cycle obtained with normal operation. As should be evident from this explanation, the host software can equally identify any of the three colors as the chosen color, loading all the LCOS LCD and LED configuration as described, configuring the switch 18 to connect the LED in package 19 of that color to all three LED drivers 15 as described, and selecting image data of the chosen color to be loaded and copied into the image buffers of all 3 colors on the CEK 14.

With respect to the application mentioned in the description of normal operation, wherein the images of the SLM are used to expose photosensitive medium, we may now observe the following advantage. As before, $T_r$, $T_g$, $T_b$ are the illumination times of each color of light required to fully expose the medium. Using the instant technique, the elapsed time required for each color's exposure is 4 times the illumination time of the color, compared with 12 times the illumination time in the normal technique. Therefore, the total exposure time is now $T_{ex}=4(T_r+T_g+T_b)$. We note that $(T_r+T_g+T_b) \leq 3 * MAX(T_r, T_g, T_b)$, and, if $T_r, T_g$ and $T_b$ are not all equal, then $(T_r+T_g+T_b) < 3 * MAX(T_r, T_g, T_b)$. In practice, it is not unusual for one of these times to be 3 or 4 times as great as the other two. We have shown, then, that the elapsed exposure time with the improved technique is at worst the same as the elapsed exposure time using the previous technique, and in practice is usually considerably shorter.

What is claimed is:

1. A method of controlling a SLM by a sequential color SLM controller, said method comprising the steps of:

a) loading control registers associated with said SLM with data values for a first color during all the field time slots for a first video frame;

b) controlling said SLM to modulate light of said first color during all the field time slots of said first video frame;

c) loading control registers associated with said SLM with data values for a second color. during all the field time slots for a second succeeding video frame; and d) controlling said SLM to modulate light of said second color during all the field time slots of said second succeeding video frame.

2. The method of claim 1 further comprising the steps of:

loading control registers associated with said SLM with data values for a third color during all the field time slots for a second succeeding video frame;

controlling said SLM to modulate light of said third color during all the field time slots of said third succeeding video frame; and repeating said aforementioned steps for the succeeding data values for said first, second and third colors corresponding respectively to the succeeding video frames.

3. The method of claim 1 wherein said first, second and third colors are each selected from the group of colors consisting of red, green and blue.

4. A method of controlling a SLM by a sequential color SLM controller comprising the steps of:

loading control registers with color data values during all the field time slots for each of a predetermined number of succeeding video frames, said color data values representing a different color for each video frame;

controlling said SLM to modulate the light of each color during all the field time slots for each video frame respectively; and repeating the aforementioned steps for a select number of times, for succeeding predetermined numbers of succeeding video frames.

5. The method of claim 4 wherein said predetermined number of succeeding video frames is three and different colors are selected from the group of colors consisting o red, green, and blue.

6. The method of claims 1 and 4 further including the steps for controlling the SLM with programmable grayscale characteristics, said further steps comprising:

a) providing a programmable grayscale SLM; and b) programming the grayscale characteristic of said SLM to implement a grayscale characteristic that is adapted for printing onto photosensitive medium.

7. The method of claim 6 wherein said grayscale characteristic is such as to cause a linear progression of optical density versus SLM pixel value in the image created on said photosensitive medium.

8. The method of claim 6 wherein said grayscale characteristic is such as to cause a linear progression of luminance versus SLM pixel value in the image created on said photosensitive medium.

* * * * *